(No Model.) 2 Sheets—Sheet 1.
M. & W. N. STEHLE.
COMBINED HEATING AND COOKING STOVE.
No. 582,703. Patented May 18, 1897.
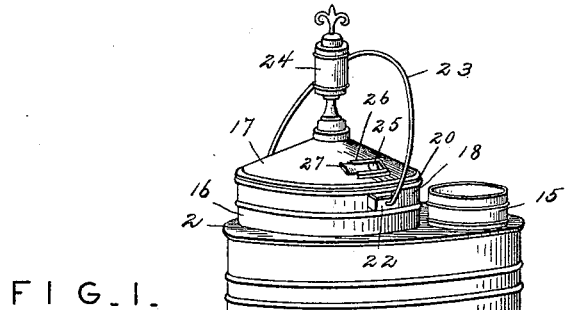
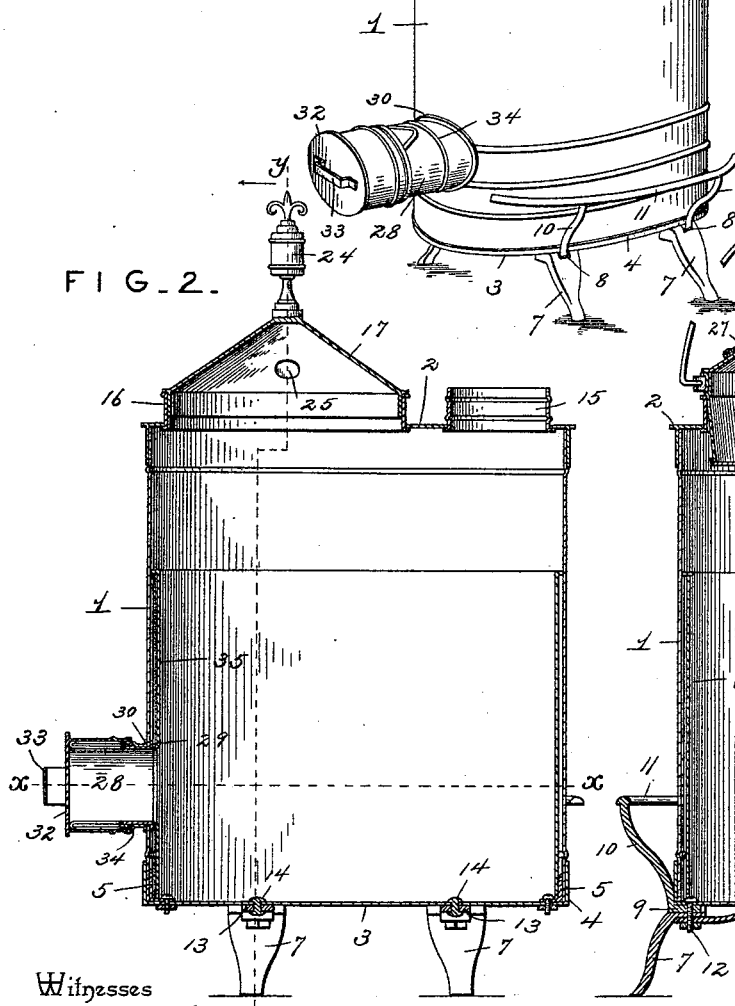
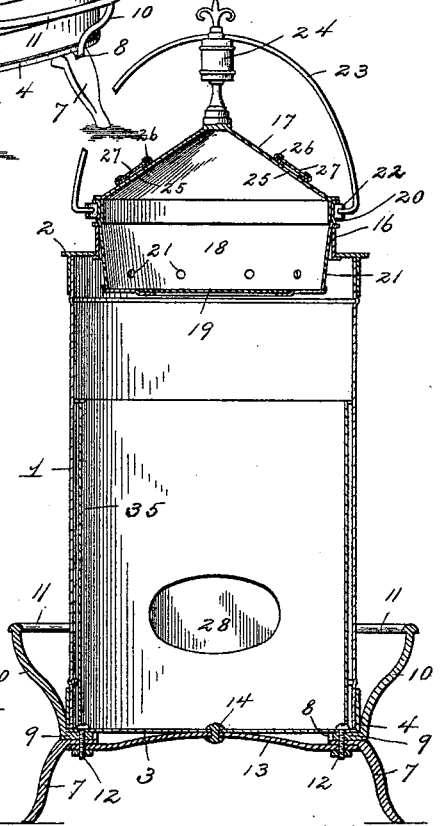
Witnesses
Harry L. Amer.
V. B. Hillyard.
By his Attorneys,
C. A. Snow & Co.
Inventors.
Martin Stehle and
William N. Stehle.
THE NORRIS PETERS CO., PHOTO-LITHO., WASHINGTON, D. C.

(No Model.) 2 Sheets—Sheet 2.
M. & W. N. STEHLE.
COMBINED HEATING AND COOKING STOVE.
No. 582,703. Patented May 18, 1897.
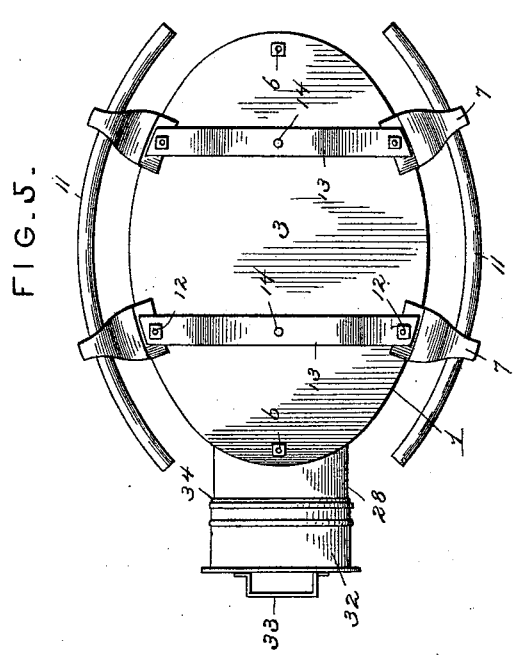
Witnesses
Harry L. Amer.
V. B. Hillyard.
By his Attorneys,
C. A. Snow & Co.
Inventors
Martin Stehle
and
William N. Stehle,

UNITED STATES PATENT OFFICE.

MARTIN STEHLE AND WILLIAM N. STEHLE, OF PERRY, MISSOURI.

COMBINED HEATING AND COOKING STOVE.

SPECIFICATION forming part of Letters Patent No. 582,703, dated May 18, 1897.

Application filed September 30, 1895. Serial No. 564,180. (No model.)

*To all whom it may concern:*

Be it known that we, MARTIN STEHLE and WILLIAM N. STEHLE, citizens of the United States, residing at Perry, in the county of Ralls and State of Missouri, have invented a new and useful Combined Heating and Cooking Stove, of which the following is a specification.

This invention aims to provide an improved heating and cooking stove of the type constructed of sheet iron or steel and in which wood is burned, and has for its object to economize in fuel, to provide for controlling the draft whereby the consumption of the fuel is regulated to meet the condition of the temperature, and, lastly, to facilitate the assembling of the parts and render repairs comparatively easy and economical, and to brace the stove and its supports.

To attain these and such other objects as belong to the nature of the invention, the latter consists in certain novel features of construction and combinations of parts, substantially as herein illustrated, described, and specifically claimed.

In the accompanying drawings is illustrated an embodiment of the invention, although changes in the form, proportion, and the minor details may be resorted to without departing from the principle or sacrificing any of the advantages of the invention, and in said drawings—

Figure 1 is a perspective view of the improved stove. Fig. 2 is a central vertical longitudinal section thereof, the pan being omitted. Fig. 3 is a plan section about on the line X X of Fig. 2. Fig. 4 is a transverse section about on the line Y Y of Fig. 2, looking in the direction of the arrow, the pan being in place. Fig. 5 is a bottom plan view. Fig. 6 is a detail view of a fender. Fig. 7 is a detail view of a leg. Fig. 8 is a detail view of the offstanding draft-tube, showing the manner of its attachment to the stove-body.

Referring by numerals to the drawings, in which the same characters denote similar and corresponding parts in all the figures, 1 indicates the body of the stove, which is oval in plan elevation and constructed of Russia iron, sheet-steel, or other suitable material; 2 the top, and 3 the bottom, of similar construction and removably fitted to the ends of the stove-body.

The bottom 3 is oval and has a vertical rim 4, which receives and embraces the lower end of the stove-body and forms a close joint therewith, the said body having angle-irons 5 at opposite points, which receive the fastenings or bolts 6, by means of which the body is positively secured to the bottom, so as to prevent accidental separation of the parts.

The legs 7 have depressions 8 in their upper ends to receive the shanks 9 at the lower ends of the arms or braces 10, which support the fender or foot-rail 11 at their upper ends. The shanks 9 come flush with the recessed ends of the legs and are secured to the stove-bottom by bolts 12, which pass through coincident openings in the stove-bottom, shanks, and upper ends of the legs. By thus disposing the parts the legs are prevented from turning upon their fastening-bolts 12, inasmuch as the shanks 9, entering the depressions or recesses 8, will preclude any turning of the legs, as will be readily comprehended. The arms or braces 10, being connected at their upper ends to the fender or foot-rail, will be prevented from turning upon the said bolts. Hence the parts will be held in fixed relation.

The arms or braces 10 are curved to enable the fenders or foot-rails to come at a proper distance from the sides of the stove to prevent the clothing from coming in contact therewith and to support the feet at a proper distance from the stove-body in the usual manner. Transverse stays or braces 13 are located beneath the bottom 3 and have their ends provided with openings to receive the bolts 12, by means of which the legs 7 are held in place, and the extremities of these stays or braces touch the inner sides of the oppositely-disposed legs and serve to fix the position and brace the said legs against spreading. The middle portion of these stays is deflected upwardly and is secured to the bottom at a medial point by a fastening 14.

The top 2 has a thimble or collar 15 at one end for the attachment therewith of the smoke-pipe and is formed with a large opening, which is surrounded by a vertical rim 16, which is wired or otherwise stiffened at its upper edge and which is closed by a conicalshaped cover 17 or is adapted to receive a shallow pan 18, whose bottom is centrally apertured and depressed around the aperture and closed by a lid 19. This pan has a rib or bead 20 spun therein near its top edge and which extends over the upper edge of the rim 16 to support the pan therein. A series of openings 21 are formed in the sides of the pan close to its bottom to afford ventilation to the said pan, so as to carry off steam and odors when cooking. Handles 22 are located at diametrically opposite points of the pan, and a bail 23 has its ends fitted to the said handles and affords a convenient means for handling the pan when it is required to remove the same from the stove. The conical cover 17 is constructed to be interchangeably fitted to the pan, so as to close it and the opening surrounded by the vertical rim 16 and is surmounted by an urn or handle 24 of suitable design. Openings 25 are formed in the sides of the cover at opposite points, and frames 26 are secured by rivets or otherwise to the cover and have ways in which operate slides 27 for controlling the openings 25 and thereby regulating the draft of the stove.

A draft-tube 28 is located near the lower end of the stove-body and is oval in cross-section and is placed with its major axis in a horizontal plane, and this draft-tube comprises an inner and an outer section, the inner section having its inner edge portion flanged, as shown at 29, to engage with the inner face of the stove-body, and the outer section having its inner end formed with a flange 30, which bears against the outer face of the said body, thereby clamping the edge portion of the stove-body surrounding the opening in which the draft-tube is fitted between the flanges 29 and 30. The top side of the draft-tube has a semicircular notch or depression 31 extending inwardly from its outer edge to afford ingress for the air to support combustion when the cap 32 is drawn partially out. The edge portion of the inner section is turned over the edge portion of the outer section surrounding the notch or depression 31 and over the end of the said outer section, thereby holding the parts or sections in proper relation.

The cap 32 is oval in form, approximating the contour of the draft-tube, and is provided with a handle 33, to be conveniently grasped when operating the said cap, and the rim of the latter encircles the outer portion of the draft-tube 28 and completely closes the notch or depression 31 when the cap is pushed in.

A swelled portion 34, near the inner end of the outer section of the draft-tube, is engaged by the inner end of the rim of the cap and forms a close joint therewith to prevent the entrance of any air when it is required to dampen or extinguish the fire.

In order to prevent the burning out of the stove, a lining 35, approximating the form of the stove-body, is fitted in the latter and is disposed to provide a space between it and the opposing sides of the stove-body to protect the latter from injury. The top edge of the lining 35 is outwardly flanged to extend over and close this space. By having the top and the bottom removably attached to the stove-body repairs can be easily and cheaply made, and the parts are readily accessible for inspection, cleaning, and for any other required purpose.

Having thus described the invention, what is claimed as new is—

1. The combination with a stove having an opening in its side, and a draft-tube fitted in the said opening and comprising an inner and an outer tubular section, and having a notch or depression extending inward from the outer end, the outer section having a swelled portion near its inner end, and the inner section having an edge portion bent over the edge of the outer section bordering upon the said notch, of a cap removably and slidably fitted to the outer end of the said draft-tube and adapted to have its inner edge engage with the aforesaid swelled portion of the outer section of the draft-tube, substantially as and for the purpose set forth.

2. The combination with a stove, of a leg having a recess in its upper end, a fender having a shank fitted in the said recess, and a fastening for positively securing the leg and fender to the stove, substantially as set forth.

3. In a stove, the combination with oppositely-disposed legs, of a transverse stay or brace having its extremities engaging with the inner sides of the said legs, and means for positively securing the ends of the said stay and the legs to the stove, substantially as set forth.

In testimony that we claim the foregoing as our own we have hereto affixed our signatures in the presence of two witnesses.

MARTIN STEHLE.
WILLIAM N. STEHLE.

Witnesses:
  B. T. WHITE,
  S. B. SMITH.